(12) United States Patent
Taniguchi et al.

(10) Patent No.: US 10,100,888 B2
(45) Date of Patent: Oct. 16, 2018

(54) BICYCLE DISC BRAKE ROTOR

(71) Applicant: Shimano Inc., Sakai-shi, Osaka (JP)

(72) Inventors: Masanori Taniguchi, Sakai (JP); Shingo Sakurai, Sakai (JP); Masahiro Nakakura, Sakai (JP); Yusuke Hosomi, Sakai (JP)

(73) Assignee: Shimano Inc., Sakai-shi, Osaka (JP)

( * ) Notice: Subject to any disclaimer, the term of this patent is extended or adjusted under 35 U.S.C. 154(b) by 0 days.

(21) Appl. No.: 15/156,201

(22) Filed: May 16, 2016

(65) Prior Publication Data

US 2017/0328428 A1  Nov. 16, 2017

(51) Int. Cl.
*F16D 65/12* (2006.01)
*F16D 65/02* (2006.01)

(52) U.S. Cl.
CPC ......... *F16D 65/121* (2013.01); *F16D 65/123* (2013.01); *F16D 2065/132* (2013.01); *F16D 2065/1312* (2013.01); *F16D 2065/1316* (2013.01)

(58) Field of Classification Search
CPC .............. F16D 65/121; F16D 65/123; F16D 2065/1312; F16D 2065/1316; F16D 2065/132
USPC ............................................ 188/26, 218 XL
See application file for complete search history.

(56) References Cited

U.S. PATENT DOCUMENTS

| 4,026,393 | A | * | 5/1977 | Gebhardt | ................ | B61H 5/00 188/218 A |
|---|---|---|---|---|---|---|
| 5,823,303 | A | * | 10/1998 | Schwarz | ............... | F16D 65/123 188/218 XL |
| 7,467,694 | B2 | * | 12/2008 | Botsch | .................. | B22D 19/12 188/218 XL |
| 7,543,691 | B2 | * | 6/2009 | Hopkins | ................. | F16D 65/12 188/218 XL |
| 8,387,760 | B2 | * | 3/2013 | Gherardi | ................. | F16D 65/12 188/18 A |
| 8,511,442 | B2 | * | 8/2013 | Mueller | ................ | F16D 65/123 188/218 XL |
| 8,522,931 | B2 | * | 9/2013 | Souwa | .................... | F16D 65/12 188/18 A |
| 8,651,248 | B2 | * | 2/2014 | Mueller | ................ | F16D 65/123 188/218 XL |
| 8,684,149 | B2 | * | 4/2014 | Mueller | ................ | F16D 65/123 188/18 A |
| 8,813,921 | B2 | * | 8/2014 | Iwai | ....................... | B60T 7/102 188/218 XL |

(Continued)

FOREIGN PATENT DOCUMENTS

DE  102005033765 A1  1/2007
DE  102010035492 A1  3/2012

*Primary Examiner* — Thomas W Irvin
(74) *Attorney, Agent, or Firm* — Alleman Hall Creasman & Tuttle LLP

(57) ABSTRACT

A bicycle disc brake rotor is provided. The bicycle disc brake rotor includes a friction disc having a center axis and including a first braking surface and a second braking surface. The bicycle disc brake rotor also includes a mounting adapter attached to a bicycle wheel and coupled to the friction disc through a coupling structure, wherein the coupling structure includes a first mating surface pair comprising a first adapter surface and a first disc surface, and a second mating surface pair comprising a second adapter surface and a second disc surface.

18 Claims, 5 Drawing Sheets

(56) References Cited

U.S. PATENT DOCUMENTS

| | | | | |
|---|---|---|---|---|
| 8,881,873 | B2* | 11/2014 | Iwai | F16D 65/125 |
| | | | | 188/218 XL |
| 8,939,266 | B2* | 1/2015 | Anderson | B22C 9/10 |
| | | | | 188/218 XL |
| 8,967,339 | B2* | 3/2015 | Drewes | F16D 65/123 |
| | | | | 188/17 |
| 8,978,842 | B2* | 3/2015 | Iwai | C23C 4/02 |
| | | | | 188/218 XL |
| 9,394,956 | B2* | 7/2016 | Saame | F16D 65/12 |
| 9,593,727 | B1* | 3/2017 | Nakakura | F16D 65/128 |
| 9,651,104 | B2* | 5/2017 | Drewes | F16D 65/123 |
| 2004/0173418 | A1* | 9/2004 | Saame | F16D 65/123 |
| | | | | 188/17 |
| 2005/0145452 | A1 | 7/2005 | Yamamoto | |
| 2006/0054422 | A1 | 3/2006 | Dimsey et al. | |
| 2008/0000729 | A1 | 1/2008 | Takizawa | |
| 2013/0168193 | A1 | 7/2013 | Iwai et al. | |
| 2013/0175125 | A1* | 7/2013 | Forster | F16D 65/123 |
| | | | | 188/218 XL |
| 2014/0158486 | A1* | 6/2014 | Schorn | F16D 65/12 |
| | | | | 188/218 XL |
| 2015/0053515 | A1* | 2/2015 | Drewes | F16D 65/0043 |
| | | | | 188/218 XL |
| 2015/0144441 | A1 | 5/2015 | Kuo | |

* cited by examiner

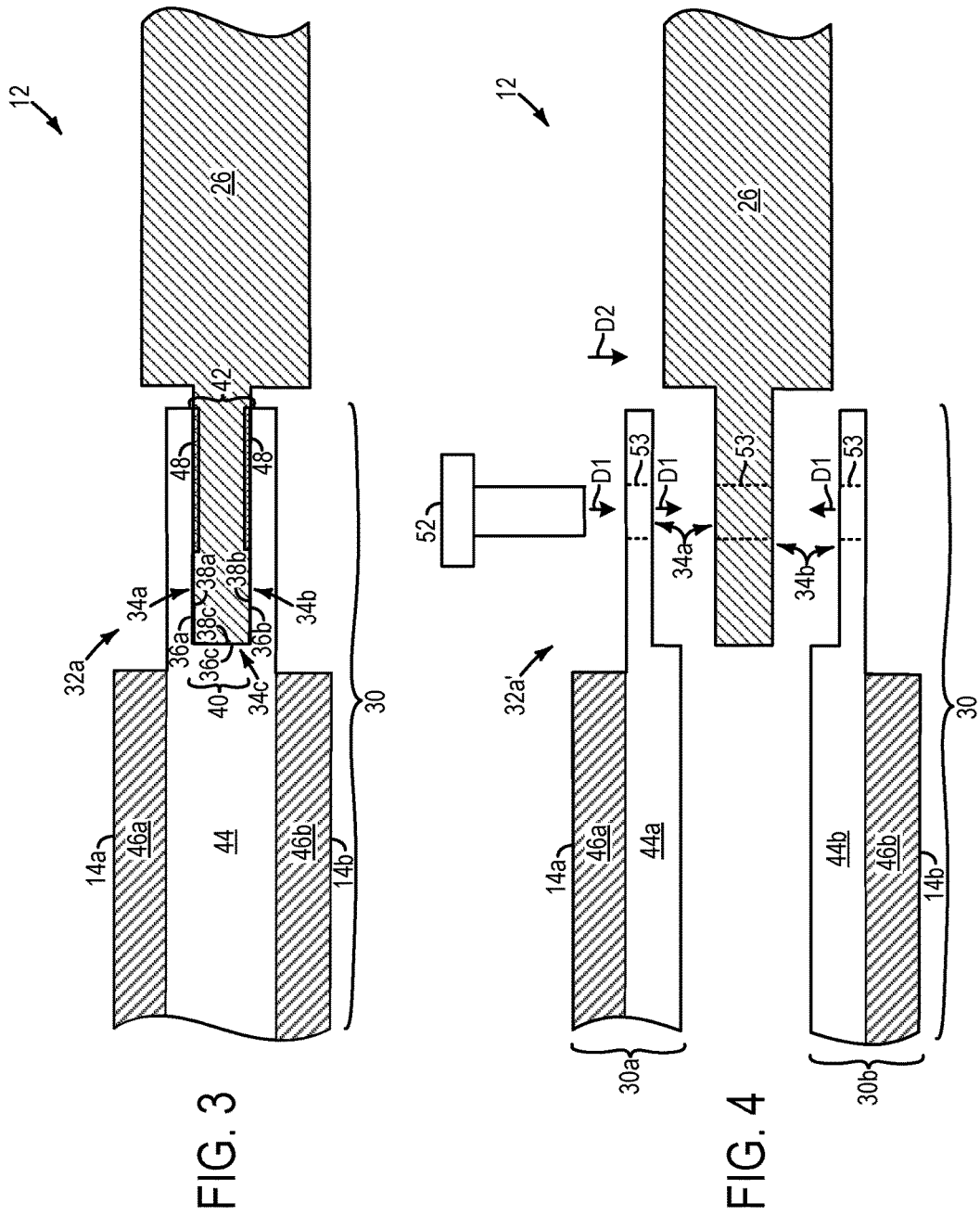

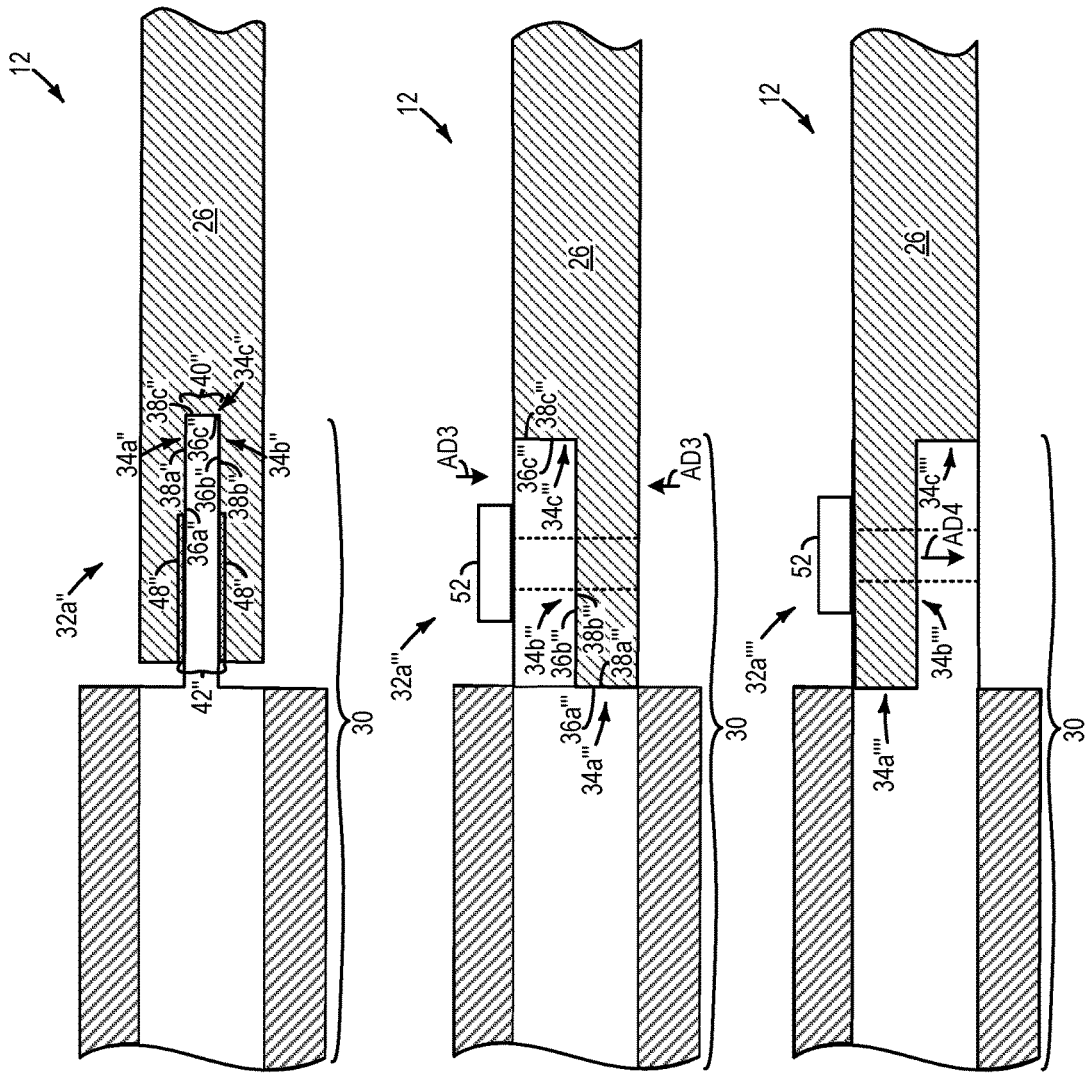

BICYCLE DISC BRAKE ROTOR

BACKGROUND

In recent years, some bicycles have been provided with disc brakes. Disc brake systems can provide a high level of braking consistency in all types of riding conditions. Disc brake systems typically include a disc brake rotor fixedly attached to a wheel and a caliper for moving brake pad(s) into contact with the bicycle disc brake rotor. The calipers can be mechanically or hydraulically actuated to cause brake pad movement(s) toward the bicycle disc brake rotor. The contact between the brake pads and bicycle disc brake rotor slows the wheel. However, frictional contact between the bicycle disc brake rotor and the brake pad(s) generates a substantial amount of waste heat during braking operation.

SUMMARY

A bicycle disc brake rotor developed to address the above identified issues is disclosed herein. According to a first aspect, the bicycle disc brake rotor may include a friction disc having a center axis and including a first braking surface and a second braking surface. The bicycle disc brake rotor also may include a mounting adapter attached to a bicycle wheel and coupled to the friction disc through a coupling structure, wherein the coupling structure includes a first mating surface pair comprising a first adapter surface and a first disc surface, and a second mating surface pair comprising a second adapter surface and a second disc surface. One potential advantage of this configuration is that the bicycle disc brake rotor can transfer an increased amount of heat away from the friction disc and to the mounting adapter to improve stability.

According to a second aspect, the bicycle disc brake rotor according to the first aspect is configured so that the first mating surface pair may be spaced away from the second mating surface pair. One potential advantage of this configuration is that the coupling structure can more evenly transfer heat from the friction disc to the mounting adapter to improve stability.

According to a third aspect, the bicycle disc brake rotor according to the second aspect is configured so that the coupling structure may further include a third mating surface pair comprising a third adapter surface and a third disc surface, the third mating surface pair arranged between the first mating surface pair and the second mating surface pair. One potential advantage of this configuration is that the coupling structure can transfer a greater amount of heat from the friction disc to the mounting adapter to further improve stability.

According to a fourth aspect, the bicycle disc brake rotor according to the second or third aspect is configured so that the first mating surface pair may be parallel to the second mating surface pair. One potential advantage of this configuration is that the coupling structure can more evenly transfer heat from the friction disc to the mounting adapter to improve stability.

According to a fifth aspect, the bicycle disc brake rotor according to the fourth aspect is configured so that the first and second mating surface pairs may be perpendicular to the center axis. One potential advantage of this configuration is to simplify assembly of the friction disc and the mounting adapter.

According to a sixth aspect, the bicycle disc brake rotor according to the fifth aspect is configured so that the third mating surface pair may be perpendicular to the first mating surface pair and the second mating surface pair. One potential advantage of this configuration is that the coupling structure can more evenly transfer heat from the friction disc to the mounting adapter to improve stability.

According to a seventh aspect, the bicycle disc brake rotor according to any one of the third to sixth aspects is configured so that the third mating surface pair may be parallel to the center axis. One potential advantage of this configuration is that it may simplify assembly of the friction disc and the mounting adapter.

According to an eighth aspect, the bicycle disc brake rotor according to any one of the third to seventh aspects is configured so that the third adapter surface may be contiguous with the first adapter surface and the second adapter surface, and the third disc surface may be contiguous with the first disc surface and the second disc surface. One potential advantage of this configuration is that the coupling structure can transfer a greater amount of heat from the friction disc to the mounting adapter to further improve stability.

According to a ninth aspect, the bicycle disc brake rotor according to any one of the second to eighth aspects is configured so that the friction disc may include one of a recess and a protrusion mated with the recess, the mounting adapter may include other of the recess and the protrusion, the first disc surface and the second disc surface may be provided on the one of the recess and the protrusion, and the first adapter surface and the second adapter surface may be provided on the other of the recess and the protrusion. One potential advantage of this configuration is that the bicycle disc brake rotor can draw an increased amount of heat away from the friction disc and transfer it to the mounting adapter to improve stability.

According to a tenth aspect, the bicycle disc brake rotor according to the ninth aspect is configured so that one of the friction disc and the mounting adapter may include a first section and a second section, the first section and the second section may be coupled to one another such that the recess is provided between the first section and the second section. One potential advantage of this configuration is to simplify assembly of the friction disc and the mounting adapter.

According to an eleventh aspect, the bicycle disc brake rotor according to the ninth or tenth aspect is configured so that the coupling structure may further include a third mating surface pair comprising a third adapter surface provided on the one of the recess and the protrusion, and a third disc surface provided on the other of the recess and the protrusion. One potential advantage of this configuration is that the bicycle disc brake rotor can draw an increased amount of heat away from the friction disc and transfer it to the mounting adapter to improve stability.

According to a twelfth aspect, the bicycle disc brake rotor according to the first aspect is configured so that the first mating surface pair may be contiguous with the second mating surface pair. One potential advantage of this configuration is that the bicycle disc brake rotor can transfer an increased amount of heat from the friction disc to the mounting adapter.

According to a thirteenth aspect, the bicycle disc brake rotor according to any one of the first to twelfth aspects is configured so that the coupling structure may further include a fastening member to fasten the friction disc to the mounting adapter. One potential advantage of this configuration is to enable quick assembly and disassembly of the mounting adapter and the friction disc.

According to a fourteenth aspect, the bicycle disc brake rotor according to the thirteenth aspect is configured so that the fastening member may extend through the first mating surface pair and the second mating surface pair. One potential advantage of this configuration is that the connection between the friction disc and the mounting adapter can be strengthened.

According to a fifteenth aspect, the bicycle disc brake rotor according to any one of the first to fourteenth aspects is configured so that at least one of the first mating surface pair and the second mating surface pair may be coupled by an adhesive material. One potential advantage of this configuration is to simplify assembly of the friction disc and the mounting adapter.

According to a sixteenth aspect, the bicycle disc brake rotor according to any one of the first to fourteenth aspects is configured so that at least one of the first mating surface pair and the second mating surface pair may be coupled by a welded section. One potential advantage of this configuration is to simplify assembly of the friction disc and the mounting adapter.

According to a seventeenth aspect, the bicycle disc brake rotor according to any one of the first to fourteenth aspects is configured so that at least one of the first mating surface pair and the second mating surface pair may be coupled by a soldered section. One potential advantage of this configuration is to simplify assembly of the friction disc and the mounting adapter.

According to a eighteenth aspect, the bicycle disc brake rotor according to any one of the first to seventeenth aspects is configured so that the friction disc may include a core portion having the first disc surface and the second disc surface, and a first outer portion attached to the core portion and the having first braking surface. One potential advantage of this configuration is that the material properties of the different portions can be selected to improve braking performance and inhibit wear of the braking surface.

According to a nineteenth aspect, the bicycle disc brake rotor according to the eighteenth aspect is configured so that the friction disc may further include a second outer portion oppositely attached to the core portion with respect to the first outer portion and having the second braking surface. One potential advantage of this configuration is that assembly and disassembly of the friction disc and mounting adapter can be simplified.

According to a twentieth aspect, the bicycle disc brake rotor according to the nineteenth aspect is configured so that the core portion may have a higher thermal conductivity than the first outer portion and the second outer portion. One potential advantage of this configuration is that the bicycle disc brake rotor can transfer an increased amount of heat from the friction disc to the mounting adapter.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Referring now to the attached drawings which form a part of this original disclosure:

FIG. 3 is a cross sectional view of the bicycle disc brake rotor illustrated in FIGS. 1 and 2 as seen along section line 3-3 of FIG. 2 with a first construction;

FIG. 4 is a cross sectional view, similar to FIG. 3, of the bicycle disc brake rotor illustrated in FIGS. 1 and 2 with a second construction;

FIG. 5 is a cross sectional view, similar to FIG. 3, of the bicycle disc brake rotor illustrated in FIGS. 1 and 2 with a third construction;

FIG. 6 is a cross sectional view, similar to FIG. 3, of the bicycle disc brake rotor illustrated in FIGS. 1 and 2 with a fourth construction;

FIG. 7 is a cross sectional view, similar to FIG. 3, of the bicycle disc brake rotor illustrated in FIGS. 1 and 2 with a fifth construction;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
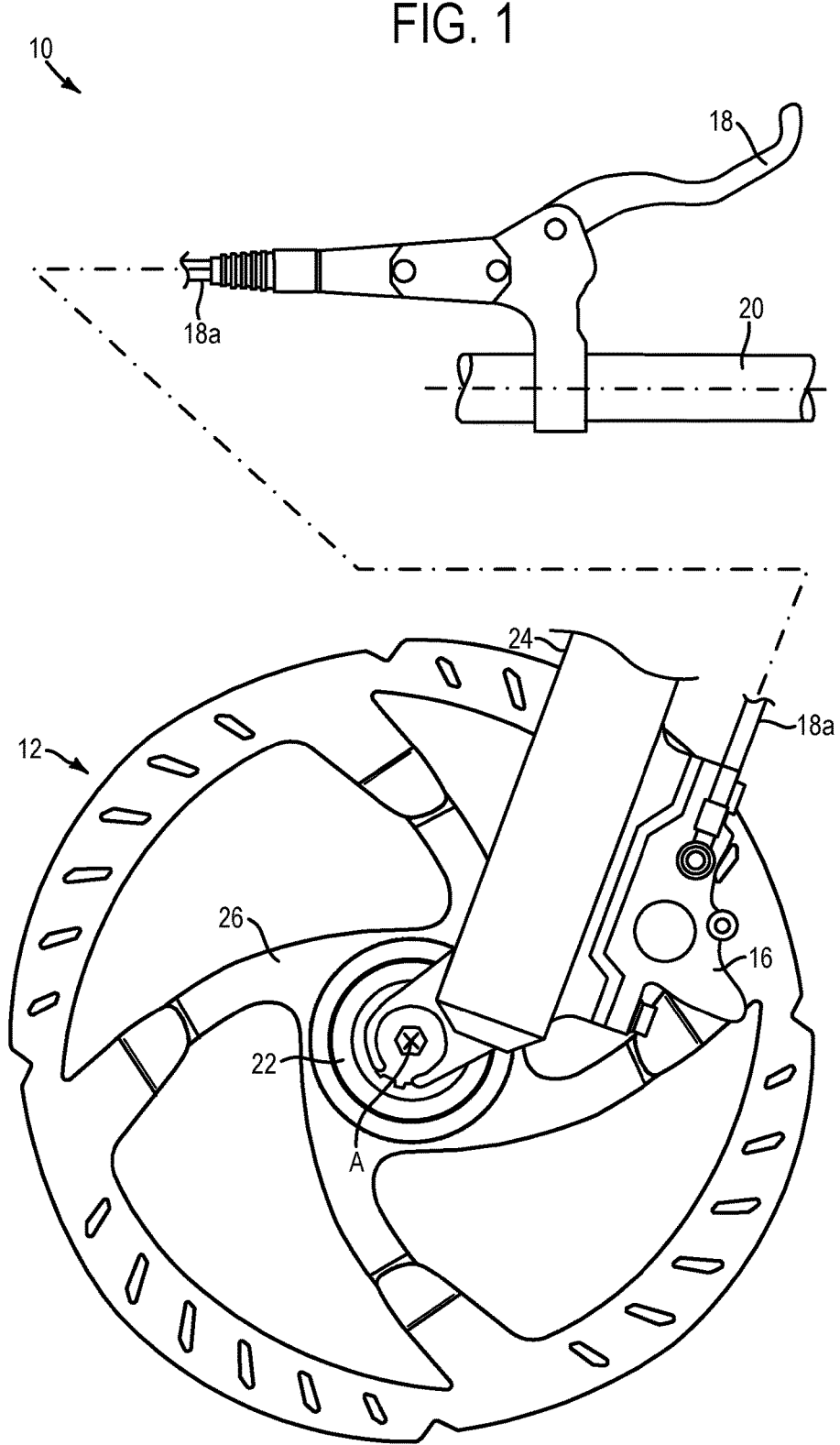
FIG. 1 is a partial side elevational view of a front disc brake system including a bicycle disc brake rotor in accordance with a first embodiment.

Referring initially to FIG. 1, a disc brake system 10 is illustrated that includes a bicycle disc brake rotor 12 in accordance with an embodiment of the present invention. As explained below, the bicycle disc brake rotor 12 has a configuration that promotes heat transfer away from the bicycle disc brake rotor 12 to improve stability in the braking system and increase longevity of the bicycle disc brake rotor 12.

The disc brake system 10 further includes a bicycle disc brake caliper 16 and a brake actuating mechanism 18 coupled to a bicycle handlebar 20. An actuation transmitter 18a (e.g., hydraulic hose or cable) extends between the brake actuating mechanism 18 and the bicycle disc brake caliper 16 in the disc brake system 10. The actuation transmitter 18a transmits an actuation force from the brake actuating mechanism 18 to the bicycle disc brake caliper 10 in response to operation of the brake actuating mechanism 18. While the disc brake system 10 is illustrated as a hydraulic braking system, the bicycle disc brake rotor 12 can be used with other types of braking systems as needed and/or desired such as mechanically actuated braking systems, wirelessly actuated braking systems, etc. When hydraulic actuation is used the disc brake system can provide significant braking power in relationship to the amount of braking force applied to the brake actuating mechanism 18.

The bicycle disc brake rotor 12 is fixedly attached to a hub 22 of a bicycle wheel. The hub 22 rotates about a center axis A. The bicycle disc brake caliper 16 is mounted to a bicycle fork 24. In other embodiments the bicycle disc brake caliper 16 may be attached to a rear portion (e.g., rear triangle) of a bicycle frame (not shown). Thus, the bicycle disc brake rotor 12 may be applied to both front and rear disc brake systems.

The bicycle disc brake caliper 16 is constructed for selectively gripping the bicycle disc brake rotor 12 to slow or stop the rotation of the bicycle wheel. During this braking operation, waste heat is generated, thereby increasing the temperature of the bicycle disc brake rotor 12. As explained below, the bicycle disc brake rotor 12 is designed to conduct heat away from the bicycle disc brake rotor 12 to other portions to reduce the temperature of the bicycle disc brake rotor 12.

The bicycle disc brake caliper 16 and brake actuating mechanism 18 include conventional components for implementing the aforementioned braking functionality. Therefore, the bicycle disc brake caliper 16 and brake actuating mechanism 18 are not shown in further detail herein.

Figure 2:
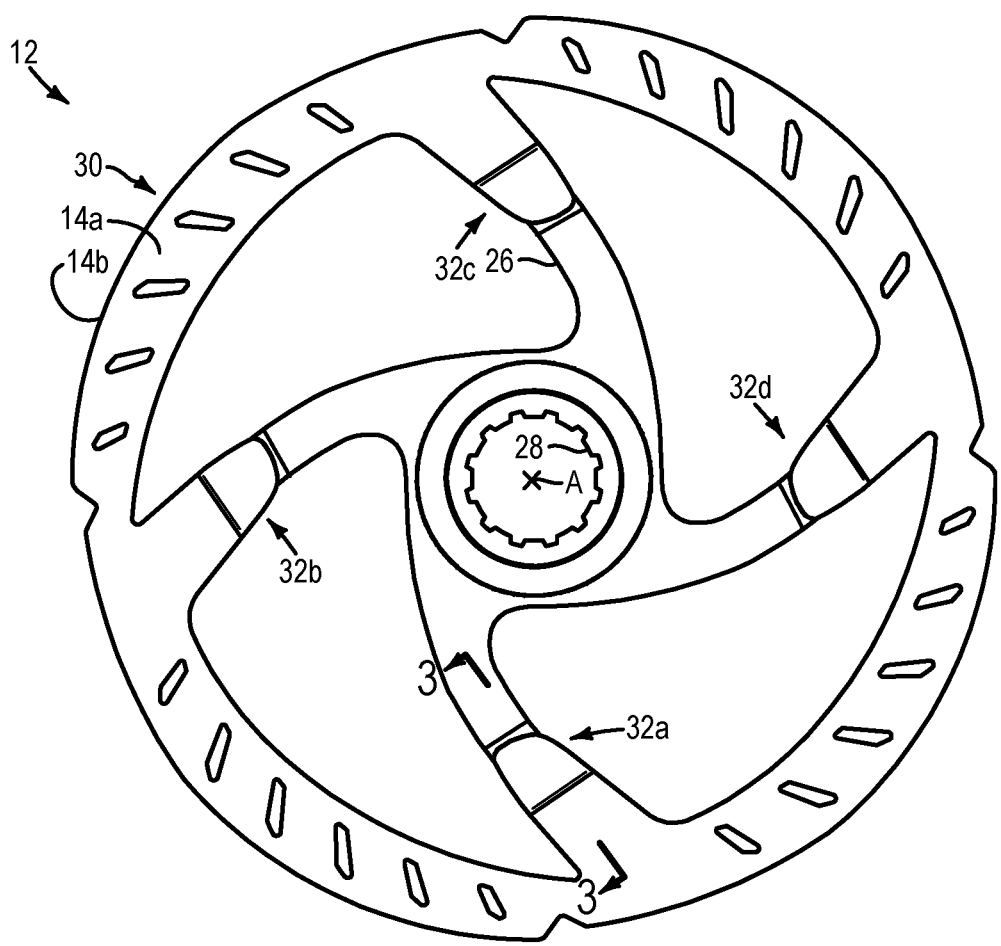
FIG. 2 is a side elevational view of the bicycle disc brake rotor illustrated in FIG. 1.

Referring now to FIG. 2, the bicycle disc brake rotor 12 comprises a friction disc 30 having a center axis A and a mounting adapter 26 attached to the bicycle wheel. The friction disc 30 includes a first braking surface 14a and a second braking surface 14b of the bicycle disc brake rotor 12. Brake pads in the bicycle disc brake caliper 16, shown in FIG. 1, contact the first and second braking surfaces 14a and 14b respectively to slow the bicycle disc brake rotor 12 during braking operation.

The mounting adapter 26 has an attachment interface 28. The attachment interface 28 is configured to attach the mounting adapter 26 to the hub 22 of the bicycle wheel, as shown in FIG. 1. The center axis A of the friction disc 30 is depicted in FIG. 2 for reference. The mounting adapter 26 is embodied as a splined attachment interface (e.g., center lock attachment interface) in FIG. 2. However, the mounting adapter 26 can be provided as a disc-shape member having no opening. Further other suitable attachment interfaces have been contemplated, such as fastener openings through which fastening members (e.g., bolts, screws, etc.,) are inserted.

The mounting adapter 26 is coupled to a friction disc 30 through a plurality of coupling structures 32a, 32b, 32c, and 32d. In the depicted embodiment, each of the coupling structures 32a, 32b, 32c, and 32d has a similar geometry and material construction. However in other examples, the profile and/or material construction of two or more of the coupling structures may differ. Further, only one coupling structure can be provided in the bicycle disc brake rotor of the present invention.

During braking operation when the brake pads in the bicycle disc brake caliper 16, shown in FIG. 1, contact the first and second braking surfaces 14a and 14b waste heat is generated. Continuing with FIG. 2, to manage the excess waste heat the bicycle disc brake rotor 12 includes several features designed to conduct heat away from the first and second braking surfaces 14a and 14b and into the mounting adapter 26. Transferring heat in this way improves stability of the outer portions of the bicycle disc brake rotor 12.

FIG. 3 illustrates a first construction of the coupling structure 32a in the bicycle disc brake rotor 12. The first construction of the coupling structure 32a includes multiple mating surface pairs that enable an increased amount of heat to be transferred from the friction disc 30 to the mounting adapter 26. Specifically in the first construction, a plurality of mating surface pairs is included in the coupling structure 32a. Each mating surface pair increases the amount of surface area through which heat can be conducted from the friction disc 30 to the mounting adapter 26. Therefore, by providing a large number of mating surface pairs heat conduction from the friction disc 30 to the mounting adapter 26 can be increased. As such, the benefits of decreased disc brake rotor distortion and expansion can be realized when a plurality of mating surface pairs are included in the coupling structure 32a.

The plurality of mating surface pairs includes first to third mating surface pairs 34a, 34b and 34c. The first mating surface pair 34a includes a first adapter surface 36a in face sharing contact with a first disc surface 38a. Likewise, the second mating surface pair 34b includes a second adapter surface 36b in face sharing contact with a second disc surface 38b. Positioning the first and second adapter surfaces 36a and 36b in direct contact with the first and second disc surfaces 38a and 38b respectively, enables increased heat conduction from the friction disc 30 to the mounting adapter 26.

In the first construction, the first mating surface pair 34a is spaced away from the second mating surface pair 34b. Additionally, in the first construction the first mating surface pair 34a is parallel to the second mating surface pair 34b. Arranging the first and second mating surface pairs 34a and 34b parallel to one another may enable heat to be more evenly conducted through the coupling structure 32a. Moreover, each of the first and second mating surface pairs 34a and 34b may be perpendicular to the center axis A, shown in FIG. 2, in one example. Arranging the first and second mating surface pairs 34a and 34b in this way has the potential benefit of simplifying assembly of the bicycle disc brake rotor 12 by enabling the mounting adapter 26 to be rotated into alignment with the friction disc 30.

Continuing with FIG. 3, the coupling structure 32a further includes the third mating surface pair 34c. The third mating surface pair 34c includes a third adapter surface 36c in contact with a third disc surface 38c. As shown in FIG. 3, the third mating surface pair 34c is arranged between the first mating surface pair 34a and the second mating surface pair 34b. Positioning the third mating surface pair 34c between the first and second mating surface pair 34a and 34b further increases the amount of heat transferred from the friction disc 30 to the mounting adapter 26 during periods of braking operation. Additionally, the third mating surface pair 34c is in a parallel arrangement with the center axis A, which extends perpendicularly into the page in FIG. 2. Additionally, the third mating surface pair 34c is perpendicular to the first mating surface pair 34a and the second mating surface pair 34b. When the third mating surface pair 34c is arranged in this way, heat may be more evenly conducted through the mating surface pairs, further improving stability.

Continuing with FIG. 3, additionally in the first construction depicted in FIG. 3 the third adapter surface 36c is contiguous with the first adapter surface 36a and the second adapter surface 36b. Likewise, the third disc surface 38c is contiguous with the first disc surface 38a and the second disc surface 38b. Positioning the disc and adapter surfaces in a contiguous arrangement with each other enables heat to be more evenly conducted from the friction disc 30 to the mounting adapter 26, further improving stability.

Additionally, in the depicted example the mounting adapter 26 includes a protrusion 40 mated with a recess 42 in the friction disc 30. The first disc surface 38a, the second disc surface 38b, and the third disc surface 38c are provided in the recess 42. On the other hand, the first adapter surface 36a, the second adapter surface 36b, and the third adapter surface 36c are included in the protrusion 40.

The friction disc 30 includes a core portion 44 and two outer portions, referred to as a first outer portion 46a and a second outer portion 46b. The first outer portion 46a is attached to the core portion 44 and the second outer portion 46b is oppositely attached to the core portion 44. Suitable attachment techniques such as welding, soldering, etc., may be used to attach the first outer portion 46a and/or second outer portion 46b to the core portion 44.

As shown in FIG. 3, the core portion 44 includes the first disc surface 38a, the second disc surface 38b, and the third disc surface 38c. The first outer portion 46a includes the first braking surface 14a and the second outer portion 46b correspondingly includes the second braking surface 14b.

In one example, the core portion 44 has a higher thermal conductivity than the first outer portion 46a and the second outer portion 46b. For instance, the first and second outer portions 46a and 46b may be constructed out of stainless steel while the core portion 44 may be constructed out of an aluminum alloy. It will be appreciated that stainless steel has more abrasion resistance than the aluminum alloy. In this way, a wear resistance material can be placed in sections contacting the brake pads to increase longevity. Conversely, the aluminum alloy has a higher thermal conductivity than stainless steel. As such, the core portion 44 is provided with a highly thermally conductive material, such as an aluminum alloy, to promote heat transfer away from the first and second braking surfaces 14a and 14b to the mounting adapter 26. In this way, the properties of different sections of the bicycle disc brake rotor 12 can be designed to improve stability.

The mounting adapter 26 may also be constructed out of a material having a higher thermal conductivity than the first and second outer portions 46a and 46b, such as an aluminum alloy, to further increase the amount of heat transferred from the friction disc 30 to the mounting adapter 26. In a further example, the mounting adapter 26 and core portion 44 may be constructed out of a metal such as an aluminum alloy with different compositions. Alternatively, in other examples, similar metal compositions may be used to construct the mounting adapter 26 and the core portion 44. Further, painting or coating with high thermal conductivity material(s) in comparison with metals, for instance synthetic resin, can be applied to the mounting adapter 26.

A coupling section 48 connecting the friction disc 30 to the mounting adapter 26 is also illustrated in FIG. 3. The coupling section 48 is positioned in the first mating surface pair 34a and the second mating surface pair 34b. However in other embodiments the coupling section may only be included in one of the mating surface pairs or in all of the mating surface pairs. The coupling section 48 may include one or more of a layer of adhesive material, a welded section, and a soldered section. Specifically in one example, at least one of the first mating surface pair 34a, the second mating surface pair 34b and the third mating surface pair 34c may be coupled by one or more of the adhesive material, the welded section and the soldered section. It will be appreciated that heat may weaken the strength of certain adhesives. Therefore welded or soldered attachment techniques may be preferred. Further in other embodiments a fastening member extending through the first and second mating surface pairs may be provided in lieu of or in addition to the coupling section 48.

FIGS. 4-8 show different constructions of the coupling structure with different arrangements of mating surface pairs. Specifically, FIG. 4 shows a second construction of the coupling structure 32a' for attaching the friction disc 30 to the mounting adapter 26 in the bicycle disc brake rotor 12. In the second construction the friction disc 30 includes a first section 30a and a second section 30b in an exploded configuration. The first section 30a includes the first outer portion 46a with the first braking surface 14a and a first core portion 44a. Likewise, the second section 30b includes the second outer portion 46b with the second braking surface 14b and a second core portion 44b. The directions D1 indicate the relative movement of each of the first section 30a, the second section 30b, and a fastening member 52 when assembling the coupling structure 32a'. It will be appreciated that the fastening member 52 is included in the coupling structure 32a' and fastens the friction disc 30 to the mounting adapter 26. Therefore, when assembled, the first and second sections 30a and 30b are coupled to one another via the fastening member 52 extending through openings 53 in the friction disc 30 and the mounting adapter 26. In particular, the fastening member 52 extends through the first mating surface pair 34a and the second mating surface pair 34b when the friction disc 30 and mounting adapter 26 are assembled. Additionally in one example, the openings 53 may be sized slightly larger than the fastening member 52 to accommodate for expansion of the mounting adapter 26 and the friction disc 30 during braking operation. In particular, the sizes of the openings 53 in the friction disc 30 and the mounting adapter 26 may be selected based on the coefficient of thermal expansion of the materials used to construct the friction disc 30 and the mounting adapter 26. Therefore, the size of the openings in the friction disc 30 and the mounting adapter 26 may vary when different materials are used to construct the friction disc and mounting adapter.

In other examples, the fastening member 52 may only extend through portions of the friction disc 30. When using a fastening member to attach the first and second sections 30a and 30b of the friction disc 30 to the mounting adapter 26, the friction disc 30 can be quickly and easily attached to/detached from the mounting adapter 26 for cleaning, repair, or replacement. Additionally, an adhesive material, a welded section and/or soldered section may be used to attach the first and second sections 30a and 30b to one another.

In the construction of the coupling structure shown in FIG. 4 as well as other coupling structure constructions described herein it may be desirable for the mounting adapter 26 to have a disclike shape as viewed from an axial direction D2 to conduct heat from the friction disc 30 to the mounting adapter 26 more efficiently.

FIG. 5 shows a third construction of the coupling structure 32a" for attaching the friction disc 30 to the mounting adapter 26 in the bicycle disc brake rotor 12. The coupling structure 32a" includes a first mating surface pair 34a", a second mating surface pair 34b", and a third mating surface pair 34c". The first mating surface pair 34a" includes a first adapter surface 36a" and a first disc surface 38a", the second mating surface pair 34b" includes a second adapter surface 36b" and a second disc surface 38b", and the third mating surface pair 34c" includes a third adapter surface 36c" and a third disc surface 38c". Coupling sections 48" are provided in the first mating surface pair 34a" and the second mating surface pair 34b". The coupling sections 48" may include one or more of a layer of adhesive material, a welded section, and a soldered section.

In the third construction illustrated in FIG. 5, the mounting adapter 26 includes a recess 42" and the friction disk 30 includes a protrusion 40". Thus, the recess 42" include the first adapter surface 36a", second adapter surface 36b", and the third adapter surface 36c" and the protrusion 40" includes the first disc surface 38a", the second disc surface 38b", and the third disc surface 38c". Therefore, embodiments where the friction disc includes one of the recess and the protrusion and the mounting adapter includes the other of the recess and the protrusion have been contemplated.

Additionally in one example, the mounting adapter 26 shown in FIG. 5 may be constructed with two sections which when assembled form the recess 42". The sections of the mounting adapter 26 may also be referred to as portions. In such an example, the first mounting adapter section includes the first adapter surface 36a" and the second mounting adapter section includes the second adapter surface 36b". Additionally, a fastening member may be used to removably attach the two sections of the mounting adapter 26. Forming the mounting adapter 26 with two sections enables the mounting adapter 26 to be attached to/detached from the friction disk 30 more easily. In one additional example, one of the friction disc and the mounting adapter may include a first section and a second section, and the first section and the second section may be coupled to one another such that the recess is provided between the first section and the second section.

FIG. 6 shows a fourth construction of the coupling structure 32a''' for attaching the friction disc 30 to the mounting adapter 26 in the bicycle disc brake rotor 12. The coupling structure 32a''' includes a first mating surface pair 34a''', a second mating surface pair 34b''', and a third mating surface pair 34c'''. The first mating surface pair 34a''' includes a first adapter surface 36a''' and a first disc surface 38a'''. The second mating surface pair 34b''' includes a second adapter surface 36b''' and a second disc surface 38b'''. Additionally, the third mating surface pair 34c''' includes a third adapter surface 36c''' and a third disc surface 38c'''. In one example, there may be a small gap (e.g., 1-2 millimeters) between the third adapter surface 36c''' and the third disc surface 38c''' to accommodate for expansion of friction disc 30 and the mounting adapter 26 due to heat. This can be particularly useful if the mounting adapter has a greater coefficient of thermal expansion than friction disc, to prevent the pinned connection of the two from causing great thermal stresses by enabling the end of the mounting adapter (i.e., the third adapter surface 36c''') to expand into the gap. In the fourth construction, the first mating surface pair 34a''' is contiguous with the second mating surface pair 34b''' and the third mating surface pair 34c''' is contiguous with the second mating surface pair 34b'''. Arranging the mating surface pairs in this way can make assembly and disassembly of friction disc 30 and the mating adapter 26 quicker and easier. For instance, to attach the friction disc 30 to the mating adapter 26 a user simply has to move each component in axial directions AD3 toward one another when assembling the bicycle disc brake rotor 12.

FIG. 7 shows a fifth construction of the coupling structure 32a'''' for attaching the friction disc 30 to the mounting adapter 26 in the bicycle disc brake rotor 12. The coupling structure 32a'''' includes a first mating surface pair 34a'''', a second mating surface pair 34b'''', and a third mating surface pair 34c''''. In the fifth construction the third mating surface pair 34c'''' is positioned inward in an axial direction AD4 from the first mating surface pair 34a''''. The fastening member 52 is also shown extending through the second mating surface pair 34b''''. The fifth construction of the coupling structure 32a'''' is otherwise similar to the fourth construction of the coupling structure 32a''' shown in FIG. 6.

Figure 8:
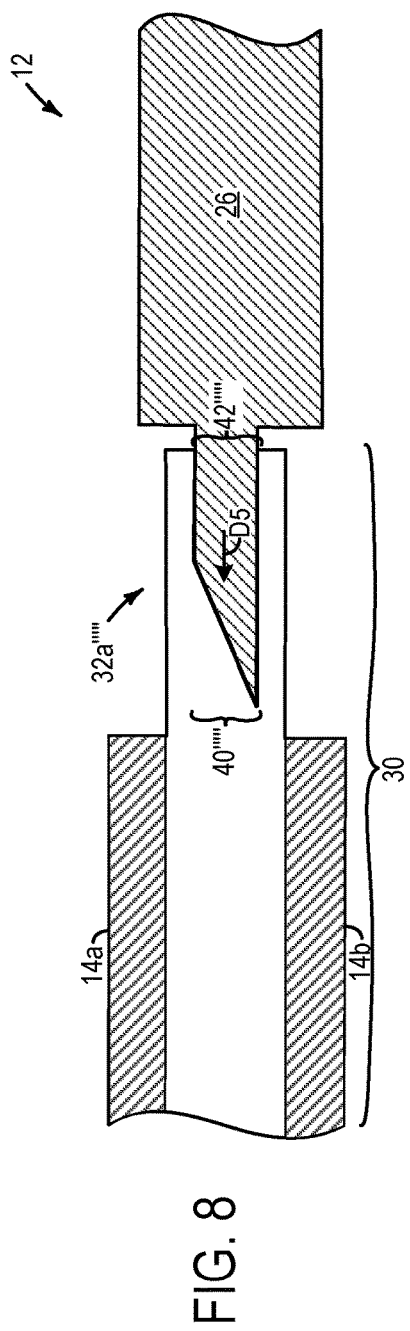
FIG. 8 is a cross sectional view, similar to FIG. 3, of the bicycle disc brake rotor illustrated in FIGS. 1 and 2 with a sixth construction.

FIG. 8 shows a sixth construction of the coupling structure 32a''''' for attaching the friction disc 30 to the mounting adapter 26 in the bicycle disc brake rotor 12. FIG. 8 shows a protrusion 40''''' in the mounting adapter 26 mated with a recess 42''''' in the friction disc 30. As shown, the protrusion 40''''' tapers in a direction D5 extending towards the first and second braking surfaces 14a and 14b in a cross-section parallel to the center axis A, shown in FIG. 2. Therefore, the protrusion 40''''' may have a triangular or trapezoidal shape in the cross-sectional view where the cutting plane is parallel to the center axis A shown in FIG. 2. Constructing the protrusion 40''''' with a tapered geometry has the potential benefit of enabling the mounting adapter 26 to be easily placed in mating engagement with the friction disc 30 during assembly. While one side is shown as tapered in FIG. 8, it will be appreciated that both sides (top and bottom sides in the view of FIG. 8) may be tapered. Alternatively, only the bottom side may be tapered.

Figure 9:
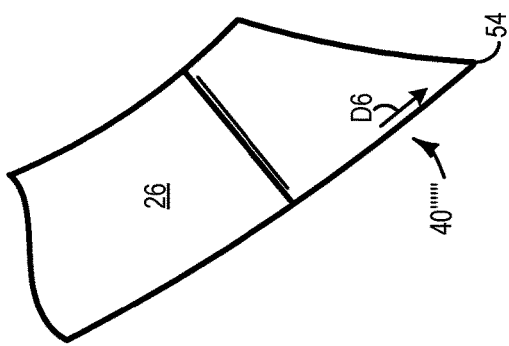
FIG. 9 is a detailed view of the mounting adapter in the bicycle disc brake rotor illustrated in FIGS. 1 and 2 with a seventh construction.

FIG. 9 shows a seventh construction of the mounting adapter 26 in the bicycle disc brake rotor 12 shown in FIGS. 1 and 2. FIG. 9 shows a protrusion 40'''''' viewed from an axial direction where the protrusion 40'''''' tapers in a direction D6 extending towards a distal end 54 of the protrusion. Constructing the protrusion 40'''''' in this way has the potential benefit of enabling the mounting adapter 26 to be easily rotated into mating engagement with the friction disc 30, shown in FIG. 2.

In the constructions of the coupling structure in the bicycle disc brake rotor described herein, more than two mating surface pairs are included in the coupling structure. However in other examples, the coupling structures may include only two mating surface pairs. In such an example, one of the mating surface pairs, such as the third mating surface pair, may be omitted from the coupling structure, for instance. Further in other examples, the coupling structure in the bicycle disc brake rotor may be provided with more than four mating surface pairs to further increase the amount of heat transferred from the friction disc to the mounting adapter.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

The invention claimed is:

1. A bicycle disc brake rotor comprising: a friction disc having a center axis and comprising:
   a core portion including a first disc surface and a second disc surface;
   a first outer portion attached to the core portion and having a first braking surface;
   a second outer portion oppositely attached to the core portion with respect to the first outer portion and having a second braking surface; and
   a mounting adapter attached to a bicycle wheel and coupled to the friction disc through a coupling structure;
   wherein the coupling structure includes a first mating surface pair comprising a first adapter surface and the first disc surface, and a second mating surface pair comprising a second adapter surface and the second disc surface, and wherein the first disc surface is different from the first braking surface.

2. The bicycle disc brake rotor of claim 1, wherein the first mating surface pair is spaced away from the second mating surface pair.

3. The bicycle disc brake rotor of claim 2, wherein the coupling structure further includes a third mating surface pair comprising a third adapter surface and a third disc surface, the third mating surface pair arranged between the first mating surface pair and the second mating surface pair.

4. The bicycle disc brake rotor of claim 3, wherein the first mating surface pair is parallel to the second mating surface pair.

5. The bicycle disc brake rotor of claim 4, wherein the first and second mating surface pairs are perpendicular to the center axis.

6. The bicycle disc brake rotor of claim 5, wherein the third mating surface pair is perpendicular to the first mating surface pair and the second mating surface pair.

7. The bicycle disc brake rotor of claim 3, wherein the third mating surface pair is parallel to the center axis.

8. The bicycle disc brake rotor of claim 3, wherein the third adapter surface is contiguous with the first adapter surface and the second adapter surface, and the third disc surface is contiguous with the first disc surface and the second disc surface.

9. The bicycle disc brake rotor of claim 2, wherein the friction disc includes one of a recess and a protrusion mated with the recess,
the mounting adapter includes other of the recess and the protrusion,
the first disc surface and the second disc surface are provided on the one of the recess and the protrusion, and
the first adapter surface and the second adapter surface are provided on the other of the recess and the protrusion.

10. The bicycle disc brake rotor of claim 9, wherein one of the friction disc and the mounting adapter includes a first section and a second section,
the first section and the second section are coupled to one another such that the recess is provided between the first section and the second section.

11. The bicycle disc brake rotor of claim 9, wherein the coupling structure further includes a third mating surface pair comprising a third adapter surface provided on the one of the recess and the protrusion, and a third disc surface provided on the other of the recess and the protrusion.

12. The bicycle disc brake rotor of claim 1, wherein the first mating surface pair is contiguous with the second mating surface pair.

13. The bicycle disc brake rotor of claim 1, wherein the coupling structure further includes a fastening member to fasten the friction disc to the mounting adapter.

14. The bicycle disc brake rotor of claim 13, wherein the fastening member extends through the first mating surface pair and the second mating surface pair.

15. The bicycle disc brake rotor of claim 1, wherein at least one of the first mating surface pair and the second mating surface pair is coupled by an adhesive material.

16. The bicycle disc brake rotor of claim 1, wherein at least one of the first mating surface pair and the second mating surface pair is coupled by a welded section.

17. The bicycle disc brake rotor of claim 1, wherein at least one of the first mating surface pair and the second mating surface pair is coupled by a soldered section.

18. The bicycle disc brake rotor of claim 1, wherein the core portion has a higher thermal conductivity than the first outer portion and the second outer portion.

* * * * *